United States Patent
Larson et al.

(10) Patent No.: US 7,073,816 B1
(45) Date of Patent: Jul. 11, 2006

(54) MULTI-USE TRAILER

(75) Inventors: Jeremy Larson, Lake Crystal, MN (US); Roger J. Scheurer, Kasota, MN (US); Vincent J. Tomlonovic, North Mankato, MN (US)

(73) Assignee: Hiniker Company, Mankato, MN (US)

( * ) Notice: Subject to any disclaimer, the term of this patent is extended or adjusted under 35 U.S.C. 154(b) by 0 days.

(21) Appl. No.: 10/971,894

(22) Filed: Oct. 22, 2004

Related U.S. Application Data

(60) Provisional application No. 60/513,395, filed on Oct. 22, 2003.

(51) Int. Cl.
*B62B 1/00* (2006.01)

(52) U.S. Cl. .................. 280/656; 280/789; 296/26.12; 296/165

(58) Field of Classification Search ................ 280/656, 280/725, 401, 408, 789, 414.1, 43.15; 296/165, 296/168, 169, 26.15, 172, 26.13, 26.12; 52/238.1, 52/68, 69
See application file for complete search history.

(56) References Cited

U.S. PATENT DOCUMENTS

| | | | | |
|---|---|---|---|---|
| 2,368,936 A | * | 2/1945 | McGehee | 296/172 |
| 4,165,117 A | * | 8/1979 | Kaiser | 296/169 |
| 4,772,038 A | * | 9/1988 | MacDonald | 280/656 |
| 4,792,274 A | * | 12/1988 | Cockram | 296/51 |
| 5,152,109 A | * | 10/1992 | Boers | 52/66 |
| 5,417,468 A | * | 5/1995 | Baumgartner et al. | 52/69 |
| 5,761,854 A | * | 6/1998 | Johnson et al. | 52/69 |
| 6,113,174 A | * | 9/2000 | McPherson | 296/26.15 |
| 6,217,106 B1 | * | 4/2001 | Reckner, Jr. | 296/169 |
| 6,511,092 B1 | * | 1/2003 | Chepa | 280/656 |
| 6,669,269 B1 | * | 12/2003 | Tran-Ngoc | 296/169 |
| 6,712,414 B1 | * | 3/2004 | Morrow | 296/26.01 |
| 6,962,370 B1 | * | 11/2005 | Simpson | 280/656 |

* cited by examiner

*Primary Examiner*—Hau Phan
(74) *Attorney, Agent, or Firm*—Farris Law, P.C.; Robert L. Farris

(57) ABSTRACT

An adjustable width trailer including a center frame with a center deck, and attached tongue and an attached guide beam that is transverse to the direction of forward movement. Left and right wheel support assemblies are slidably mounted on the guide beam. Left and right tire and wheel assemblies are attached to the wheel support assemblies by suspension assemblies. A left wing frame and a right wing frame, with wing decks are pivotally attached to the center frame, when the wheel support assemblies are in inboard positions, the wing frames are folded. When the wheel support assemblies are slid on the guide beam to outboard positions, the left and right wheels are outboard from the sides of the center frame and the left and right wing frames sit on the adjacent wheel support assemblies and are held in horizontal positions.

5 Claims, 8 Drawing Sheets

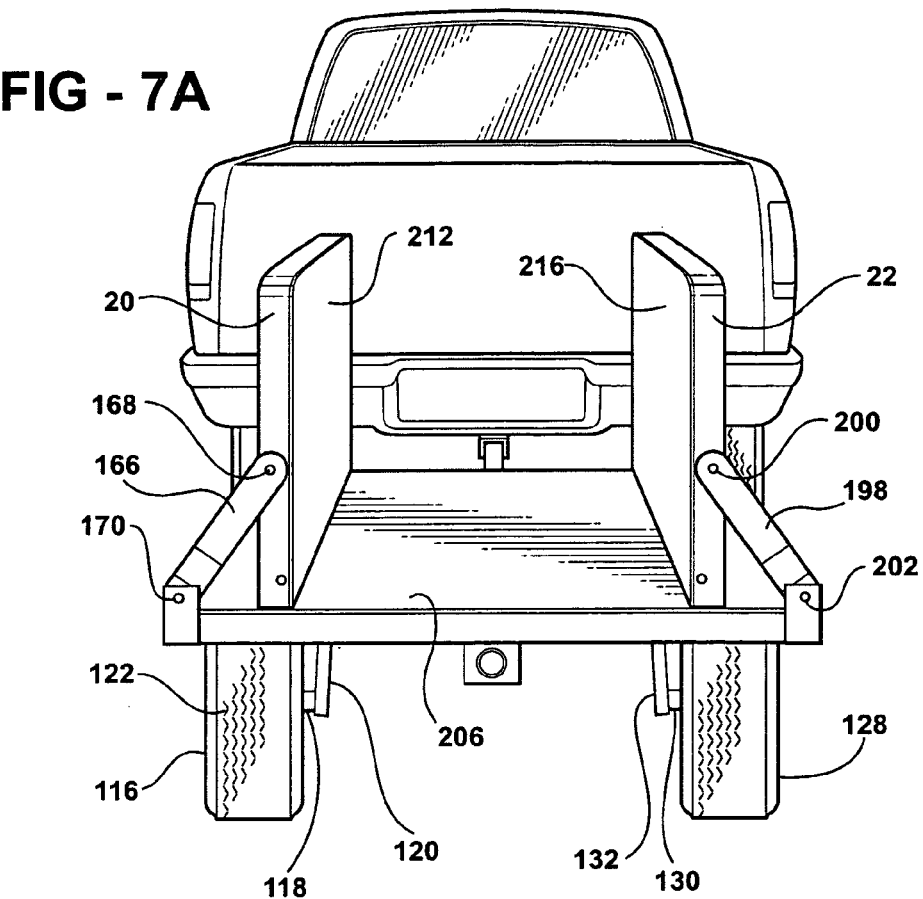

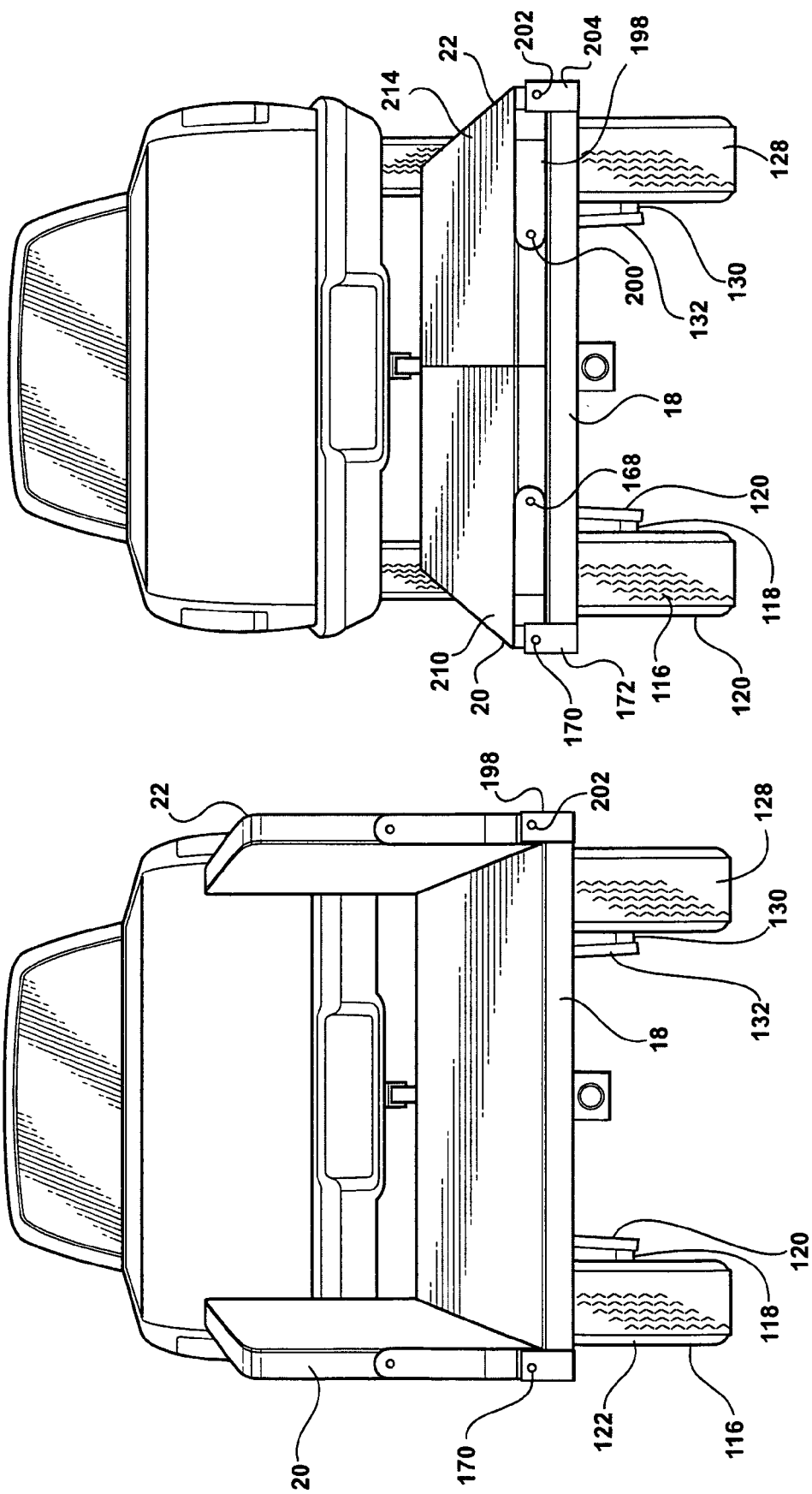

MULTI-USE TRAILER

CROSS REFERENCE TO RELATED APPLICATIONS

This application claims the benefit of the filing date of U.S. Provisional Application No. 60/513,395, titled "Multi-Use Trailer," filed Oct. 22, 2003.

TECHNICAL FIELD OF THE INVENTION

A trailer having adjustable width and length that permits use behind a full size vehicle on public roads as well as use behind an all terrain vehicle on trails and off road areas.

BACKGROUND OF THE INVENTION

Field of the Invention

Light weight trailers are available that can transport two snowmobiles or all terrain vehicles (ATV). The snowmobiles and ATVs can be loaded on the trailers in fore and aft orientation. Both ATVs and snowmobiles can also be loaded on these trailers in a transverse position. However, the front skis of some large snowmobiles may extend laterally out past a side of a trailer and may even exceed the legal width for moving on public roads without over width markings.

ATVs are transported on trailers, pulled on public roads, to and from areas where they are to be used. ATVs are used to transport various types of cargo to areas that are not accessible by most road vehicles. Trailers and sleds are often pulled by ATVs and snowmobiles to carry cargo. These trailers or sleds are generally about the same size as the unit they are pulled by so that they can be used on narrow trails that accommodate the pulling unit. With the trailers currently used to transport ATVs, a trailer or sled for carrying cargo on narrow trails takes about the same space as the ATV or snowmobile. This results in a reduction in the number of ATVs or snowmobiles that can be transported by the trailer on a public road.

SUMMARY OF THE INVENTION

The adjustable width trailer has a center frame with a rear beam, a front beam and at least one fore and aft extending beam fixed to the rear beam and the front beam. A center deck, that is generally rectangular, substantially covers the center frame. A rear guide beam is fixed to the at least one fore and aft extending beam between the front beam and the rear beam. The rear guide beam is substantially parallel to the rear beam. A front guide beam is fixed to the at least one fore and aft extending beam between the front beam and the rear guide beam. The front guide beam is spaced from and parallel to the rear guide beam. A left wheel support assembly is slidably mounted on the rear guide beam and the front guide beam. A left tire and wheel is journaled on a left spindle and attached to the left wheel support assemble by a left suspension assembly. A right wheel support assembly is slidably mounted on the rear guide beam and the front guide beam. A right tire and wheel is journaled on a right spindle and attached to the right wheel support assembly by a right suspension assembly. A left wing frame is pivotally attached to a left side of the center frame. The left wing frame is pivotable between a left wing horizontal position extending laterally to the left of the left center frame and a left wing folded position. A left wing deck is attached to the left wing frame. A right wing frame is pivotally attached to a right side of the center frame. The right wing frame is pivotable between a right wing horizontal position extending laterally to the right of the right side of the center frame and a right wing folded position. A right wing deck is attached to the right wing frame. A hitch tongue is attached to the center frame and extends forward from the front beam. The left tire and wheel is directly below the left wing frame when the left wing is in the left wing horizontal position extending to the left of the left side of the center frame and the left wheel support assembly is in a left wheel support assembly outboard position on the rear guide beam and the front guide beam. The right tire and wheel is directly below the right wing frame when the right wing is in the right wing horizontal position extending to the right of the right side of the center frame and the right wheel support assembly is in a right wheel support assembly outboard position.

BRIEF DESCRIPTION OF THE DRAWINGS

These and other objects, features and advantages will become more readily apparent in view of the following detailed description and best mode, appended claims and accompanying drawings, in which:

FIG. 7A is a perspective view showing the wing frames in the same position shown in FIGS. 5 and 6;

FIG. 7B is a perspective view showing the wing frames in the position shown in FIGS. 1 and 2;

FIG. 7C is a perspective view showing each wing frame in a wide vertical position; and FIG. 7D is a perspective view showing the wing frames in the same position shown in FIGS. 3 and 4.

DETAILED DESCRIPTION OF THE PREFERRED EMBODIMENTS

Figure 1:
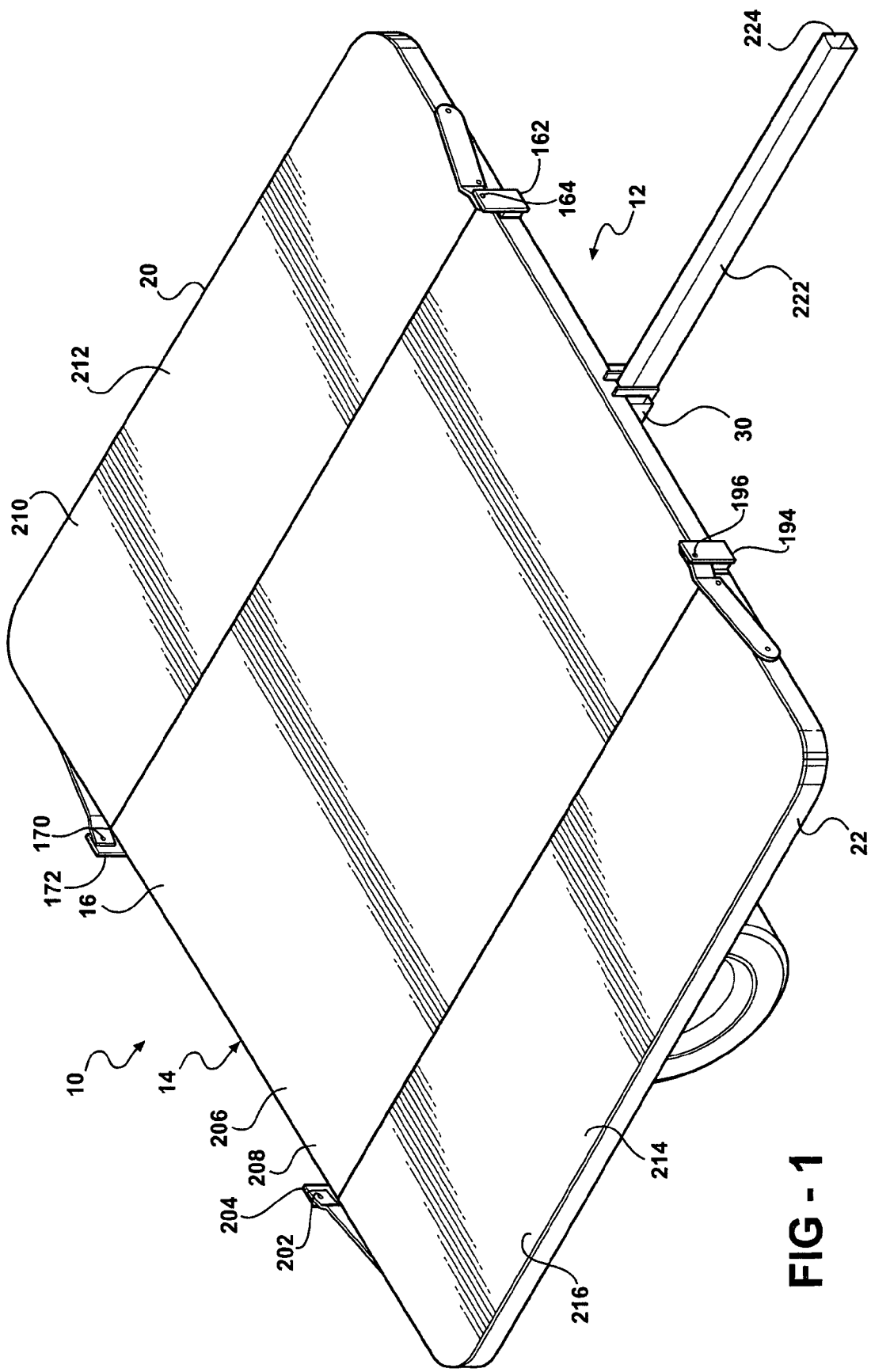
FIG. 1 is a perspective view of the trailer with the left wing and right wing in extended horizontal positions and the wheels extended.

The multi-use trailer 10 includes a frame assembly 12 and a deck 14 with a cargo support surface 16. The frame assembly 12 includes a center frame 18, a left wing frame 20 and right wing frame 22. The center frame 18 includes fore and aft extending U-shape channel 24 with an open top. The U-shaped channel 24 has a horizontal base 26, a vertical left wall 28, and a vertical right wall 30. A left flange 32 of the U-shaped channel 24 is integral with the top of the left wall 28 and extends laterally outward from the channel. A right flange 34 is integral with the top of the right wall 30 and extends laterally outward away from the left flange 32. A rear rectangular tube 36 is fixed to the flanges 32 and 34 at the rear end of the U-shaped channel 24. A rear intermediate tube 38 is fixed to the flanges 32 and 34 forward from and parallel to the rear tube 36. A left rear side rail tube 40 is fixed to the left end of the rear tube 36 and the left end of the rear intermediate tube 38. A right rear side rail tube 42 is fixed to the right end of the rear tube 36 and right end of the rear intermediate tube 38. A rear guide tube 44 is fixed to the forward end of the left rear side rail tube 40, the left flange 32, and the right flange 34, and to the forward end of the right side rail tube 42. The rear guide tube 44 is parallel to and spaced a short distance forward of the rear intermediate tube 38. The top of the guide tube 44 is spaced a short distance below the top of the rear tube 36.

A front rectangular tube 46 is fixed to the flanges 32 and 34 at the front end of the U-shaped channel 24. A front guide tube 48 is fixed to the left flange 32 and to the right flange 34 of the U-shaped channel 24 between the front tube 46 and the rear guide tube 44. A left front side rail 50 is fixed to the left end of the front tube 46 and to the left end of the guide tube 48. A right front side rail 52 is fixed to the right end of the front tube 46 and to the right end of the front guide tube 48. A tension bar 54 is connected to the left front side rail 50 and to the right front side rail 52 forward and above the front guide tube 48.

A left wheel support 56 includes two spaced apart for and aft extending tubes 58 and 60. A horizontal plate 62 is connected to the forward ends of the tubes 58 and 60. A 90° angle member 64 has a horizontal portion 66 that is fixed to the horizontal plate 62 and a vertical portion 68 that extends upward from the horizontal plate. The horizontal portion 66, of the 90° angle member 64, engages the bottom surface of the front guide tube 48 and a vertical portion 68 engages the vertical rear wall of the front guide tube 48. A horizontal top plate 70 is secured to a flange 72 integral with the vertical portions 68 of the angle member 64 and extending rearward from the upper edge of the vertical portion. The top plate 70 extends forward from the flange 72. A bottom surface of the top plate 70 is engagable with the top of the front guide tube 48. The angle member 64 extends laterally outward from the horizontal plate 62 and the tube 60.

A 90° angle member 74 is fixed to the rear ends of the tubes 58 and 60 and extends laterally outward to the left of the tube 60. The horizontal portion 76, of the angel member 74, engages the bottom wall of the rear guide tube 44. A vertical portion 78, of the angle member 74, engages a vertical front wall of the rear guide tube 44. An upper 90° angle member 80 has a vertical portion 82 that extends downward and is fixed to the rear of the horizontal portion 76 of the angle member 74. The horizontal portion 84, of the angle member 80, extends forward from the vertical portion 82, past the vertical portion 78 of the angle member 74 and is fixed to the angle member. The vertical portion 82, of the angle member 80, engages the rear wall of the rear guide tube 44. The horizontal portion 84, of the angle member 80, engages the top wall of the rear guide tube 44. The angle member 74 extends laterally outward to the left of the tube 60.

A right wheel support 86 includes two spaced apart fore and aft extending tubes 88 and 90. A horizontal plate 92 is connected to the forward ends of the tubes 88 and 90. A 90° angle member 94 has a horizontal portion 96 that is fixed to the horizontal plate 92 and a vertical portion 98 that extends upward from the horizontal plate. The horizontal portion 96, of the 90° angle member 94, engages the bottom surface of the front guide tube 48 and the vertical portion 98 engages the vertical rear wall of the front guide tube. A horizontal top plate 100 is secured to a flange 102 integral with a vertical portion 98, of the angle member 94, and extends rearward from the upper edge of the vertical portion. The top plate 100 extends forward from the flange 102. A bottom surface of the top plate 100 is engagable with the top of the front guide tube 48. The angle member 94 extends laterally outward to the right of the horizontal plate 92 and the tube 90.

A 90° angle member 104 is fixed to the rear ends of the tubes 88 and 90 and extends laterally outward to the right of the tube 90. A horizontal portion 106, of the angle member 104, engages the bottom wall of the rear guide tube 44. A vertical portion 108, of the angle member 104, engages a vertical front wall of the rear guide tube 44. An upper 90° angle member 110 has a vertical portion 112 that extends downward and is fixed to the rear of the horizontal portion 106 of the angle member 104. The horizontal portion 114 of the upper angle member 110 extends forward from the vertical portion 112 past the vertical portion 108, of the angle member 104, and is fixed to the vertical portion of the angle member. The vertical portion 112 of the angle member 110 engages the rear wall of the rear guide tube 44. The horizontal portion 114, of the upper angle member 110, engages the top wall of the rear guide tube 44. The angle member 104 extends laterally outward to the right of the fore and aft tube 90.

The left tire and wheel 116 is journaled on a spindle 118. The spindle 118 is integral with an arm 120. The arm 120 is integral with a torque shaft 122 journaled in a square tube 124. An inner end of the torque shaft 122 is anchored to the tube 124. The tube 124 is attached to mounting plates 126 and 127. This connection between the tube 124 and the mounting plates 126 and 127 will provide some camber for the left wheel 116. The mounting plates 126 and 127 are secured to the tubes 58 and 60. The torque shaft 122, arm 120 and spindle 118 provide a spring suspension for the left tire and wheel 116.

The right tire and wheel 128 is journaled on a spindle 130 that is integral with an arm 132. The arm 132 is integral with a torque shaft 134 journaled in a square tube 136. An inner end of the torque shaft 134 is anchored to the tube 136. The tube 136 is attached to mounting plates 138 and 140. This connection between the tube 136 and the mounting plates 138 and 140 will provide some camber for the right wheel 128. The mounting plates 138 and 140 are secured to the tubes 88 and 90 of the right wheel support 86. The torque shaft 134, arm 132 and spindle 130 provide a spring suspension for the right tire and wheel 128.

The left wing frame 20 is made from tubular members with rectangular cross sections. These tubular members include a rear wing tube 142, a front wing tube 144 and an outside rail 146. A rear intermediate wing tube 148 and a front intermediate wing tube 150 are attached to the outside wing rail 146. A rear inside tube 152 extends from an inboard end of a rear wing tube 142 to an inboard end of the intermediate wing tube 148 and is fixed to the rear wing tube and the rear intermediate wing tube. A front inside side wing tube 154 extends from the inboard end of the front intermediate tube 150 to the inboard end of the front wing tube 144 and is fixed to the intermediate wing tube and to the front wing tube.

A front arm 156 is pivotally attached to the tube 144 of the left wing 20 by pivot pin 158. The arm 156 is also attached to the front tube 144 by a removable pin 160. The front arm 156 is also pivotally attached to a bracket 162 by pivot pin 164. The bracket 162 is secured to the front tube 46 of the center frame 18. A rear arm 166 is pivotally attached to the rear wing tube 142 of the left wing 20 by pivot pin 168 that is coaxial with the pivot pin 164. The rear arm 166 is also attached to the rear wing tube 142 by second removable pin 160. A pivot pin 170 pivotally anchors the rear arm 166 to a bracket 172 secured to the rear rectangular tube 36 of the center frame 18. The pivot pin 164 and the pivot pin 170 are coaxial.

The right wing frame 22 is made from tubular members with rectangular cross sections like the left wing frame 20. These tubular members include a rear wing tube 174, a front wing tube 176 and an outside wing rail 178. A rear intermediate wing tube 180 and a front intermediate wing tube 182 are attached to the outside wing rail 178. A rear inside wing tube 184 extends from an inboard end of the rear wing tube 174 to an inboard end of the intermediate tube 180 and is fixed to the rear wing tube 174 and the rear intermediate wing tube. A front inside wing tube 186 extends from the inboard end of the front intermediate wing tube 182 to the inboard end of the front wing tube 176 and is fixed to the intermediate wing tube and to the front wing tube.

A front arm 188 is pivotally attached to the front wing tube 176, of the right wing 122, by a pivot pin 190. The front arm 188 is also pivotally attached to the tube 176 by a removable pin 192. The front arm 188 is also pivotally attached to a bracket 194 by pivot pin 196. The bracket 194 is secured to the front tube 46 of the center frame 18. A rear arm 198 is pivotally attached to the rear wing tube 174, of the right wing 22, by a pivot pin 200 that is coaxial with the pivot pin 190. The rear arm 198 is also attached to the rear wing tube 174 by a second removable pin like the pin 192. A pivot pin 202 pivotally attaches the rear arm 198 to a bracket 204 secured to the rear rectangular tube 36 of the center frame 18. The pivot pin 196 and the pivot pin 202 are coaxial.

The deck 14 with a cargo support 16 includes a center deck plate 206 that is secured to the upper surface 207 of the center frame 18. A center deck cargo support surface 208 is a portion of the total cargo support surface 16. The left wing deck 210 with a left wing deck cargo support surface 212 and a right wing deck plate 214 with a right wing deck cargo support surface 216 provide the remainder of the cargo support surface 116. The center deck cargo support surface 208 provides substantially half of the cargo support surface 16. The left wing deck cargo support surface 212 provides substantially a quarter of the cargo support surface 16. The right wing deck cargo support surface 216 provides the remaining quarter of the total cargo support surface 16. The left wing deck plate 210 is attached to the upper surface 218 of the left wing frame 20. The right wing deck plate 214 is attached to the upper surface 220 of the right wing frame 22.

A tongue tube 222 is telescopically received in the U-shaped channel 24. A ball receiver for a ball and socket type hitch (not shown) is normally attached to the forward end 224 of the tongue 222. Hitch assemblies other than a ball and socket type hitch can be attached to the tongue 222. The length of the portion of the tongue 222 extending from a forward end of the U-shaped channel 24 is adjustable by sliding the tongue into or out of the channel and then locking the tongue in the desired position. Locking the tongue 222 in position can be as simple as sliding a pin or a bolt through alined apertures through the tongue and the U-shaped channel 24.

Figure 2:
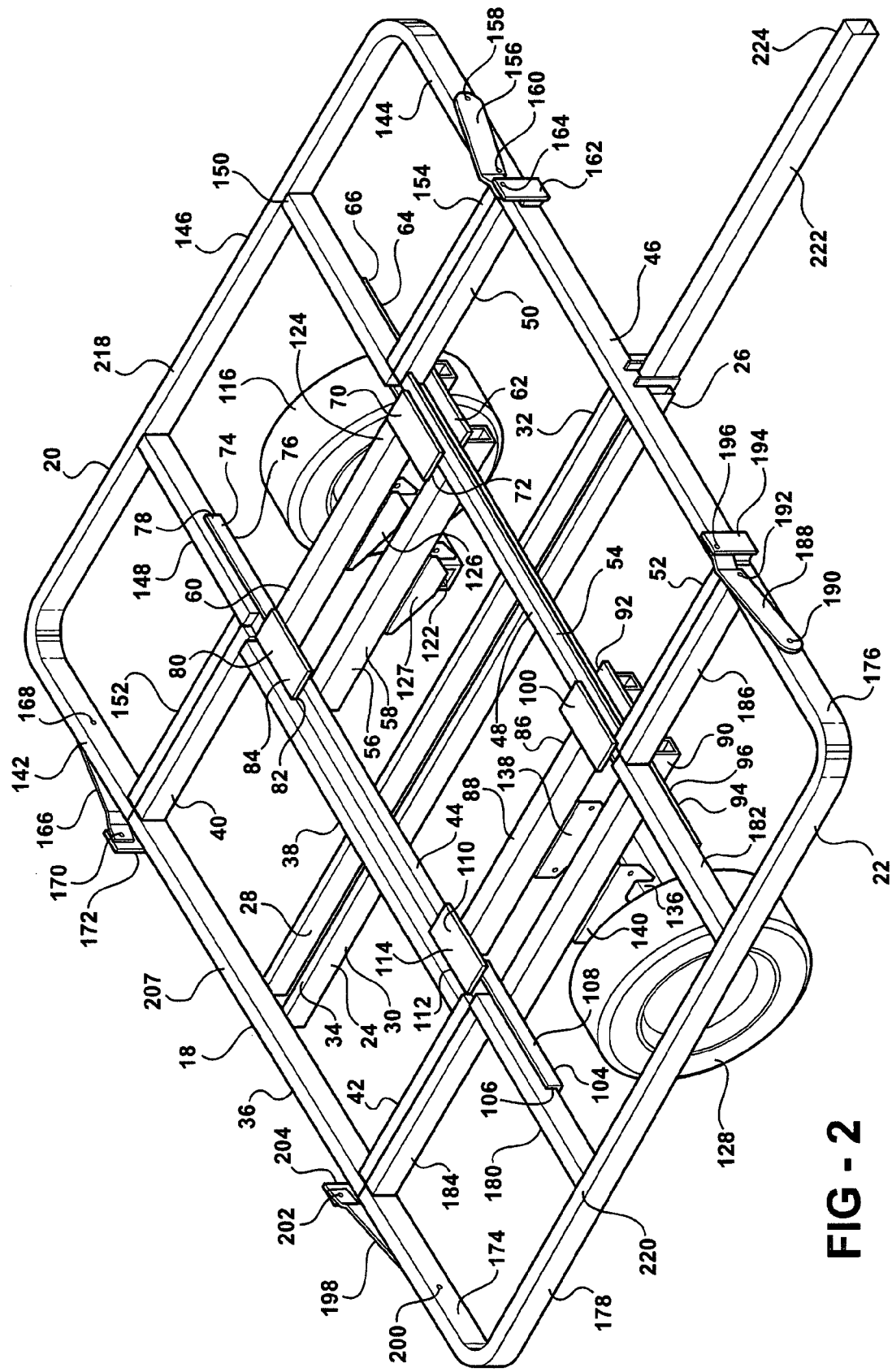
FIG. 2 is a perspective view, similar to FIG. 1, with the central deck and the wing decks removed to expose the main frame, the wing frames and the wheel and axle assemblies.

FIGS. 1 and 2 show the trailer 10 with a left wing frame 20 and the right wing frame 22 in extending horizontal positions and the left wing cargo supporting surface 212 and the right wing cargo supporting surface 216 in a common plane with the center deck cargo supporting surface 208. In this position, the rear intermediate wing tube 148, of the left wing frame 20, is setting on the angle member 74, the front intermediate wing tube 150 is setting on the angle member 64, the tube 60 of the left wheel support 56 is adjacent to the inner ends of the wing tubes 148 and 150 and the left wheel support has been slid outward on the rear guide tube 44 and the front guide tube 48 to a position to which the left tire and wheel 116 are in their farthest working position from the U-shaped channel 24. The removable pins 160 are inserted into the front arm 156 and the rear arm 166 to lock the left wing 20 in the extended position. In the position shown in FIGS. 1 and 2, the rear intermediate tube 180 and the front intermediate tube 182 of the right wing frame 22 are setting on the angle members 94 and 104 and the fore and aft extending tube 90 is adjacent to the inner ends of the wing tubes 180 and 182 and the right wheel support 86 is at its outer most working position and the tire and wheel 128 are positioned in the farthest working position from the U-shaped channel 24. The removable pins 192 are inserted through the front arm 188 and the rear arm 198 and into the wing frame 22 to hold the wing frame in a horizontal position. In the positions shown in FIGS. 1 and 2 the trailer 10 could transport two ATVs positioned side by side and facing in the direction of forward movement of the trailer 10. The tongue 122 is extending out of the U-shaped channel to provide clearance for turning with a wide highway vehicle.

Figure 3:
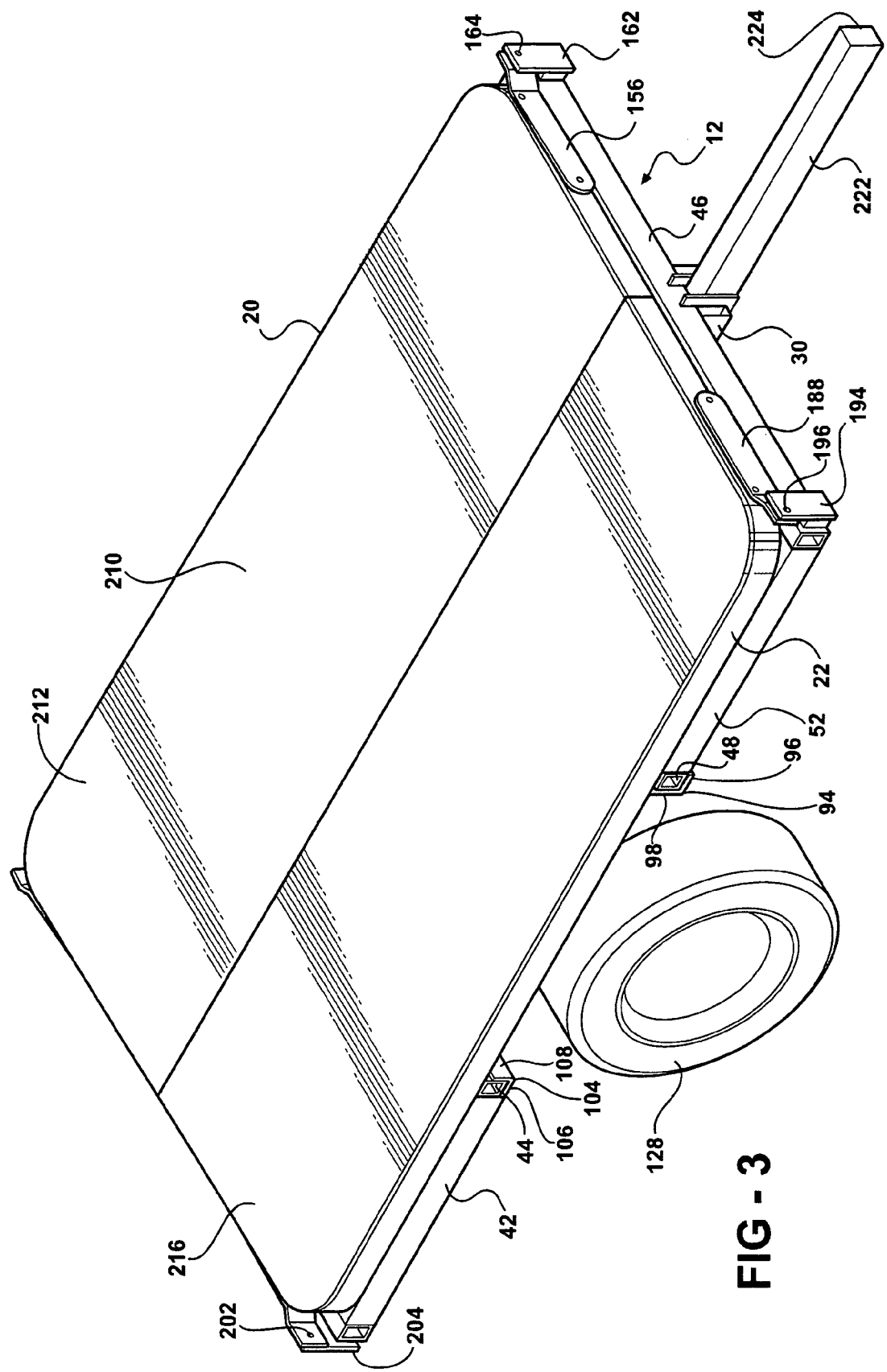
FIG. 3 is a perspective view of the trailer with the left wing and the right wing both in folded horizontal positions and the wheels retracted.
Figure 4:
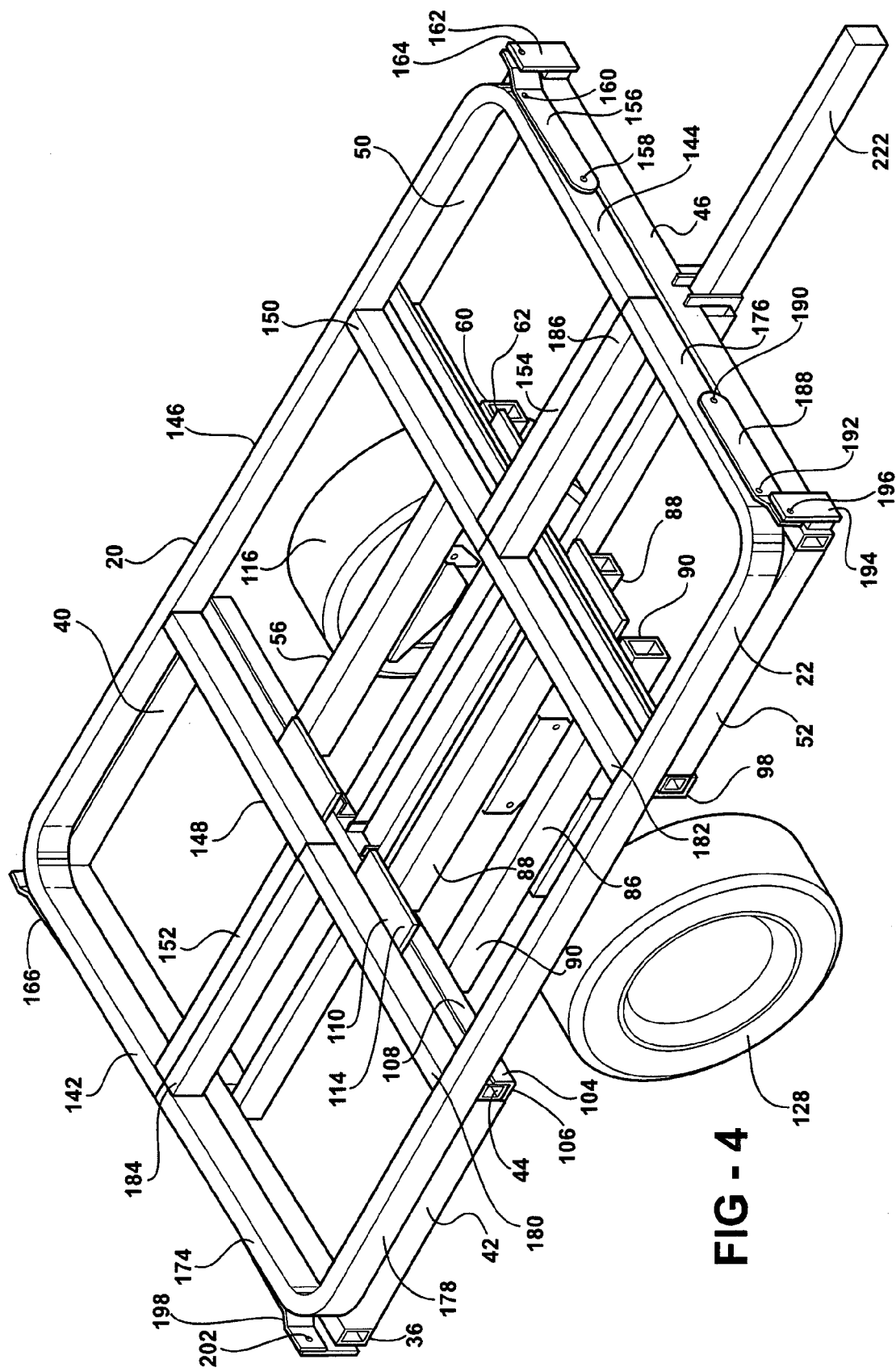
FIG. 4 is a perspective view, similar to FIG. 3, with the center deck and both wing decks removed to expose the frame assembly.

FIGS. 3 and 4 show that trailer 10 with the left wing frame 20 and the right wing frame 22 setting on top of the center deck plate 206 and in an engagement with center deck cargo supporting surface 208. The removable pins 160 and 192 are removed to permit the wing frames 20 and 22 to rotate relative to their respective front and rear arms 156 and 166 and 176 and 198 thereby positioning the left and right wing deck cargo support surfaces 212 and 216 facing upward. In this position the width of the total cargo support surface available to receive cargo is about half the total width as shown in FIGS. 1 and 2. The left wheel support 56 and the right wheel support 86 are both slid inward on the rear guide tube 44 and the front guide tube 48 toward the U-shaped channel 24. Retainers (not shown) are provided to hold the wheel supports 56 and 86 in selected positions. With the wheel supports 56 and 86 as well as the left wing 20 and the right wing 22 in the position shown in FIGS. 3 and 4, the trailer 10 is substantially half the width shown in FIGS. 1 and 2. An ATV can pull the trailer 10 on narrow trails or into areas without trails. The trailer 10 could also be pulled by a snowmobile if desired. Trailer skis can replace the left and right tires and wheels 116 and 128 as a primary support for the trailer 10 if necessary. With the trailer 10 and a narrow configuration, the tongue 222 can be slid into the U-shaped channel 24 to shorten the trailer 10.

Figure 5:
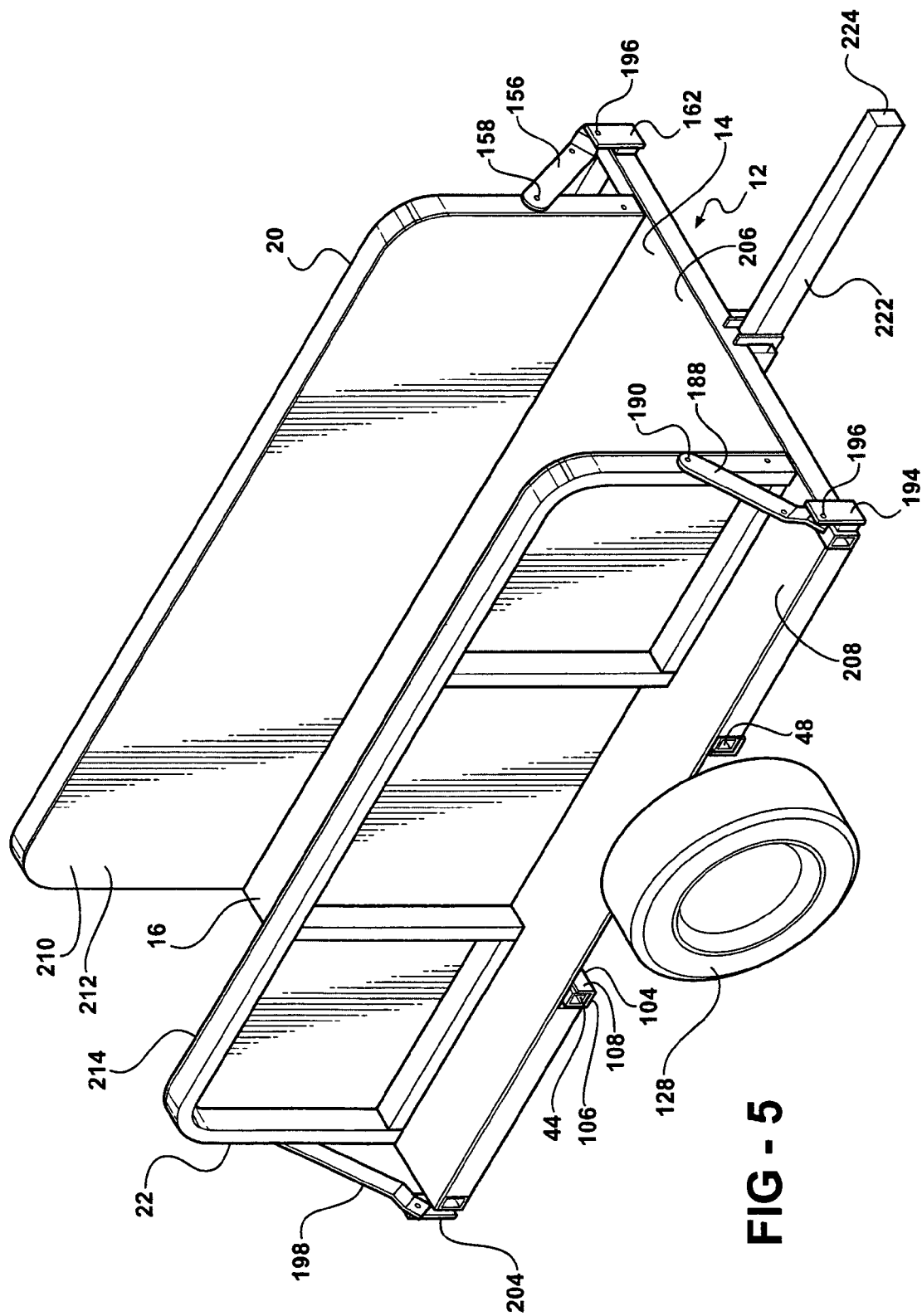
FIG. 5 is a perspective view of the trailer with the left wing and the right wing both in vertical positions.
Figure 6:
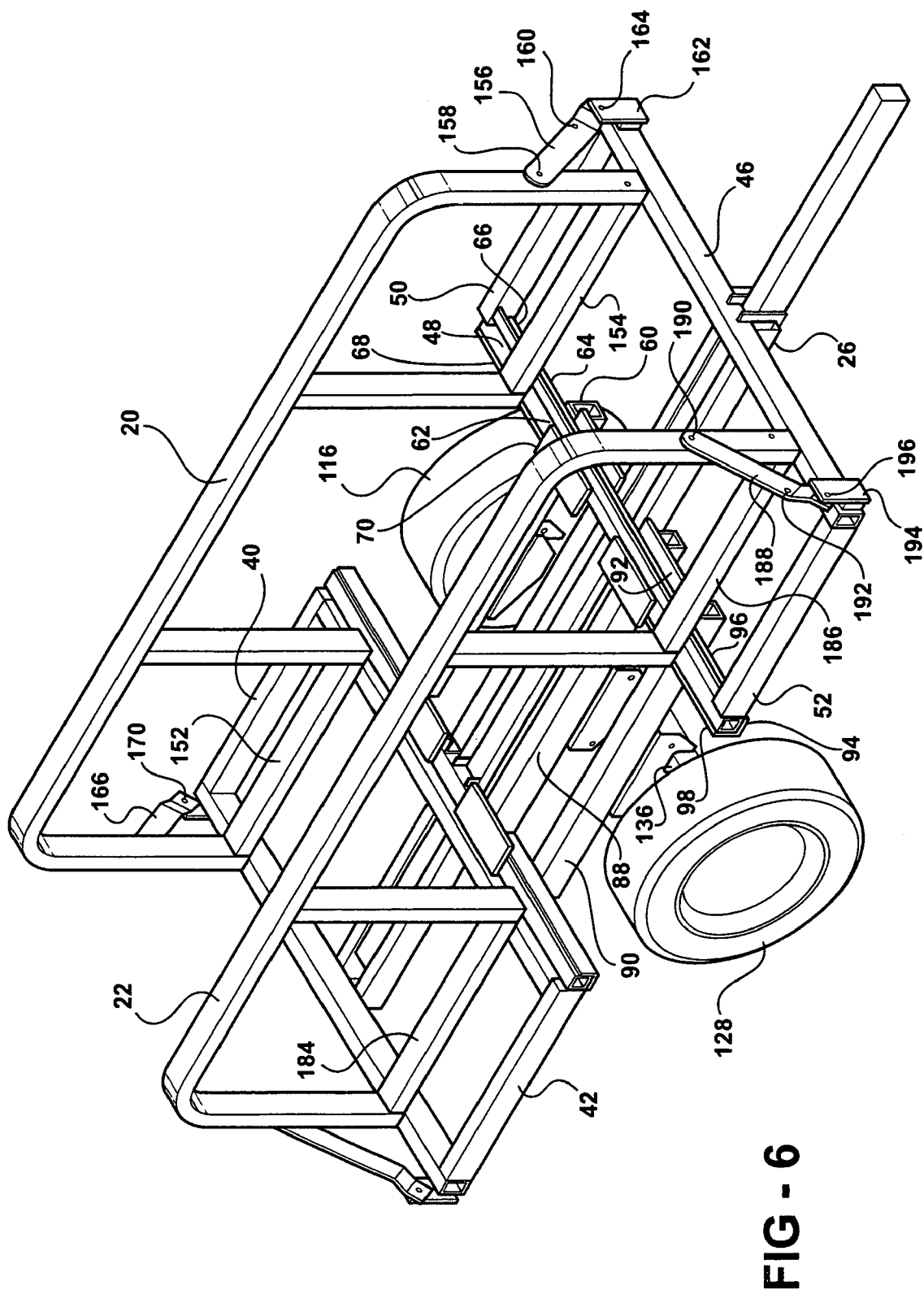
FIG. 6 is s perspective view, similar to FIG. 5, with the center deck and both wing decks removed to expose the frame and assembly.

Another option available on the trailer 10 is in a narrow configuration is to pivot the left and right wing frames 20 and 22 to their vertical positions shown in FIGS. 5 and 6. In the vertical positions with the left and right wing deck cargo support surfaces 212 and 216 facing each other, cargo such as fire wood or gravel can be retained by the wings. Removable fasteners are used to hold the wing frames 20 and 22 in the position shown in FIGS. 5 and 6.

Another options is to pivot the left and right wing frames 20 and 22 to vertical positions with the left and right wing deck plates 210 and 214 on the outside of the vertical wing frames as shown in FIG. 7C. In this position retainers would be required to hold the wing frames in the vertical position.

A further option is to fix the front arms 156 and 188 and the rear arms 166 and 198 to their respective wing frames 20 and 22. With the arms 156 and 166 fixed to the left wing frame 20, the left wing frame can be pivoted about the axis of pivot pin 164 and pivot pin 170 between a horizontal position shown in FIG. 1 and a generally vertical position. The right wing frame 22 can pivot about the axis of pivot pin 196 and pivot pin 202 between a horizontal position and a generally vertical position when the front arm 188 and the rear arm 198 are fixed to the right wing frame. A retainer member or members are required to hold the wing frames 20 and 22 in vertical positions when the arms 156, 188, 166 and 198 are fixed to their respective wings.

We claim:

1. An adjustable width trailer comprising:
   a center frame supporting a center deck with a cargo support surface and having a center frame front end, a center frame rear end, a center frame left side and a center frame right side;
   at least one guide beam attached to the center frame;
   a left wheel support assembly slidably mounted on the at least one guide beam, a left tire and wheel journaled on a left spindle attached to the left wheel support assembly and wherein the left tire and wheel slide relative to the at least one guide beam, with the left wheel support assembly between a left tire and wheel inboard position and a left tire and wheel outboard position that is outboard of the center frame left side;
   a right wheel support assembly mounted on the at least one guide beam, a right tire and wheel journaled on a right spindle attached to the right wheel support assembly and wherein the right tire and wheel slide, relative to the at least one guide beam, with the right wheel support assembly between a right tire and wheel inboard position and a right tire and wheel outboard position that is outboard of the center frame right side;
   a left wing frame pivotally attached to the center frame left side for pivotal movement between a left wing horizontal position extending laterally to the left of the center fame left side and a left wing folded position, and a left wing deck attached to the left wing frame;
   a right wing frame pivotally attached to the center frame right side for pivotal movement between a right wing horizontal position extending laterally to the right of the center frame right side and a right wing folded position, and a right wing deck attached to the right wing frame; and
   a hitch tongue attached to the center frame and extending forward from the center frame front end.

2. An adjustable width trailer, as set forth in claim 1, including a left wing frame engaging surface on the left wheel support assembly that engages and supports the left wing frame when the left tire and wheel are in the left tire and wheel outboard position and the left wing is in the left wing horizontal position; and
   including a right wing frame engaging surface on the right wheel support assembly that engages and supports the right wing frame when the right tire and wheel are in the right tire and wheel outboard position and the right wing is in the right wing horizontal position.

3. An adjustable width trailer, as set forth in a claim 1, including:
   a left suspension assembly connected to the left wheel support assembly and to the left tire and wheel; and
   a right suspension assembly connected to the right wheel support assembly and to the right tire and wheel support assembly.

4. An adjustable width trailer, as set forth in claim 3, wherein the left suspension assembly includes a left torque shaft journaled in a left tube; and wherein the right suspension assembly includes a right torque shaft journaled in a right tube.

5. An adjustable width trailer comprising;
   a center frame with a rear beam, a front beam, at least one fore and aft extending beam fixed to the rear beam and the front beam, a center deck that is generally rectangular and substantially covers the center frame, a rear guide beam fixed to the at least one fore and aft extending beam between the front beam and the rear beam and a front guide beam between the front beam and the rear guide beam, and wherein the front guide beam is spaced from and parallel to the rear guide beam;
   a left wheel support assembly slidably mounted on the rear guide beam and the front guide beam, a left tire and wheel journaled on a left spindle and attached to the left wheel support assembly by a left suspension assembly;
   a right wheel support assembly slidably mounted on the rear guide beam and the front guide beam, a right tire and wheel journaled on a right spindle and attached to the right wheel support assembly by a right suspension assembly;
   a left wing frame pivotally attached to a left side of the center frame for pivotal movement between a left wing horizontal position extending laterally to the left of the left side of the center frame and a left wing folded position, and left wing deck attached to the left wing frame;
   a right wing frame pivotally attached to a right side of the center frame for pivotal movement between a right wing horizontal position extending laterally to the right of the right side of the center frame and a right wing folded position, and a right wing deck attached to the right wing frame;
   a hitch tongue attached to the center frame and extending forward from the front beam; and
   wherein the left tire and wheel is directly below the left wing frame when the left wing is in the left wing horizontal position extending to the left of the left side of the center frame and the left wheel support assembly is in a left wheel support assembly outboard position on the rear guide beam and the front guide beam, and wherein the right tire and wheel is directly below the right wing frame when the right wing is in the right wing horizontal position extending to the right of the right side of the center frame and the right wheel support assembly is in a right wheel support assembly outboard position.

* * * * *